United States Patent
Kim et al.

(10) Patent No.: US 12,024,220 B2
(45) Date of Patent: Jul. 2, 2024

(54) STEERING APPARATUS FOR VEHICLE

(71) Applicant: HL Mando Corporation, Pyeongtaek-si (KR)

(72) Inventors: Eungsu Kim, Gwangju-si (KR); Daehee Jung, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 539 days.

(21) Appl. No.: 17/416,022

(22) PCT Filed: Dec. 12, 2019

(86) PCT No.: PCT/KR2019/017599
§ 371 (c)(1),
(2) Date: Jun. 18, 2021

(87) PCT Pub. No.: WO2020/130488
PCT Pub. Date: Jun. 25, 2020

(65) Prior Publication Data
US 2022/0063702 A1    Mar. 3, 2022

(30) Foreign Application Priority Data
Dec. 19, 2018    (KR) .................. 10-2018-0164709

(51) Int. Cl.
*B62D 1/16* (2006.01)
*B62D 5/04* (2006.01)
*B62D 6/10* (2006.01)

(52) U.S. Cl.
CPC ......... *B62D 1/163* (2013.01); *B62D 5/0403* (2013.01); *B62D 5/0415* (2013.01); *B62D 5/0463* (2013.01); *B62D 6/10* (2013.01)

(58) Field of Classification Search
CPC .... B62D 1/163; B62D 5/0403; B62D 5/0415; B62D 6/10; B62D 5/006
See application file for complete search history.

(56) References Cited

U.S. PATENT DOCUMENTS 5,029,659 A * 7/1991 Saito ................... B62D 5/0412
180/443
5,230,397 A * 7/1993 Tranchon ............. B62D 5/0412
180/444
(Continued)

FOREIGN PATENT DOCUMENTS

| CN | 105247330 A | 1/2016 |
| CN | 105882740 A | 8/2016 |

(Continued)

OTHER PUBLICATIONS

International Search Report issued Mar. 19, 2020 corresponding to International Application No. PCT/KR2019/017599.
(Continued)

*Primary Examiner* — Tony H Winner
*Assistant Examiner* — Hosam Shabara
(74) *Attorney, Agent, or Firm* — Hauptman Ham, LLP (57) ABSTRACT

According to the present embodiments, a torque applied to a torsion bar is attenuated to thus relatively increase the rigidity of the torsion bar, thereby improving the response performance to a driver's steering wheel operation, increasing a responsive torque range, securing the durability of components such as the torsion bar, and simplifying adjustment of the moving distance of a rack bar compared to the number of revolutions of the steering wheel.

17 Claims, 8 Drawing Sheets

(56) References Cited

U.S. PATENT DOCUMENTS

| | | | |
|---|---|---|---|
| 6,328,128 | B1 | 12/2001 | Chikaraishi |
| 6,364,050 | B1 | 4/2002 | Horton |
| 6,892,605 | B2* | 5/2005 | Menjak .................. B62D 5/006 74/552 |
| 9,302,701 | B2* | 4/2016 | Schneider .............. B62D 5/046 |
| 2003/0146037 | A1* | 8/2003 | Menjak .................. B62D 5/006 180/402 |
| 2003/0164060 | A1 | 9/2003 | Menjak |
| 2008/0023257 | A1* | 1/2008 | Budaker ............. B62D 5/0412 180/444 |
| 2009/0101429 | A1* | 4/2009 | Williams ............... B62D 5/003 180/402 |
| 2016/0282208 | A1 | 9/2016 | Tsunoda et al. |

FOREIGN PATENT DOCUMENTS

| | | |
|---|---|---|
| CN | 107207036 A | 9/2017 |
| CN | 113195335 A | 7/2021 |
| JP | H05-288617 A1 | 11/1993 |
| JP | 2003-118620 A | 4/2003 |
| JP | 2008-279808 A | 11/2008 |

OTHER PUBLICATIONS

Chinese Office Action dated Apr. 29, 2023 for corresponding Chinese Patent Application No. 201980084766.3, 8 pages.

* cited by examiner

STEERING APPARATUS FOR VEHICLE

CROSS-REFERENCE TO RELATED APPLICATION

The present application is a national stage filing under 35 U.S.C § 371 of PCT application number PCT/KR2019/017599 filed on Dec. 12, 2019 which is based upon and claims the benefit of priorities to Korean Patent Application No. 10-2018-0164709 filed on Dec. 19, 2018, in the Korean Intellectual Property Office. Both of the aforementioned applications are hereby incorporated by reference in their entireties.

TECHNICAL FIELD

The present embodiments relate to steering devices for vehicles, and more specifically, to steering devices for vehicles, which may attenuate the torque applied to the torsion bar and hence relatively increase the rigidity of the torsion bar, thereby enhancing the responsiveness to the driver's steering wheel manipulation, increasing the responsive torque range, securing the durability of parts, e.g., the torsion bar, and enabling simplified adjustment for the moving distance of the rack bar relative to the number of rotations of the steering wheel.

BACKGROUND ART

A steering shaft comes with an actuator (e.g., a motor) to generate auxiliary torque for allowing the driver to easily manipulate the steering wheel. The actuator is controlled by an electronic control unit provided in the vehicle.

The electronic control unit receives various pieces of information, such as the velocity or direction of the vehicle, from sensors installed to the vehicle and transmits electric signals for controlling the actuator based on the information.

To detect the driver's steering torque and transmit it to the electronic control unit, in conventional steering devices, an input shaft connected with a steering wheel and an output shaft connected with a pinion shaft engaged with a rack bar are coupled together via a torsion bar, a torque sensor coupled to a steering shaft detects the phase difference between the input shaft and the output shaft to thereby calculate the driver's steering torque and transmits the steering torque to the electronic control unit, and the actuator generates the auxiliary torque calculated by the electronic control unit to the output shaft.

In this case, if the rigidity of the torsion bar is small, the phase difference between the input shaft and the output shaft increases, so that responsiveness to the driver's steering wheel manipulation may be deteriorated. Thus, it is needed to use a high-rigidity torsion bar. In conventional steering devices, however, the torsion bar is provided coaxially with the input shaft. Thus, the diameter of the torsion bar is limited, and so is increasing its rigidity.

DISCLOSURE

Technical Problem

The present embodiments have been devised in the above-described background and aim to attenuate the torque applied to the torsion bar and hence relatively increase the rigidity of the torsion bar, thereby enhancing the responsiveness to the driver's steering wheel manipulation, increasing the responsive torque range, securing the durability of parts, e.g., the torsion bar, and enabling simplified adjustment for the moving distance of the rack bar relative to the number of rotations of the steering wheel.

The objects of the present embodiments are not limited to the foregoing and other objects will be apparent to one of ordinary skill in the art from the following detailed description.

Technical Solution

According to the present embodiments, there may be provided a steering device of a vehicle, comprising an input shaft provided with an input shaft gear, a first shaft provided with a first gear unit and rotated by the input shaft, a second shaft coupled with the first shaft via a torsion bar and provided with a second gear unit, a sensor detecting a phase difference between the first shaft and the second shaft, and an output shaft provided with an output shaft gear and rotated by the second shaft.

Advantageous Effects

According to the present embodiments, it is possible to attenuate the torque applied to the torsion bar and hence relatively increase the rigidity of the torsion bar, thereby enhancing the responsiveness to the driver's steering wheel manipulation, increasing the responsive torque range, securing the durability of parts, e.g., the torsion bar, and enabling simplified adjustment for the moving distance of the rack bar relative to the number of rotations of the steering wheel.

MODE FOR INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 1:
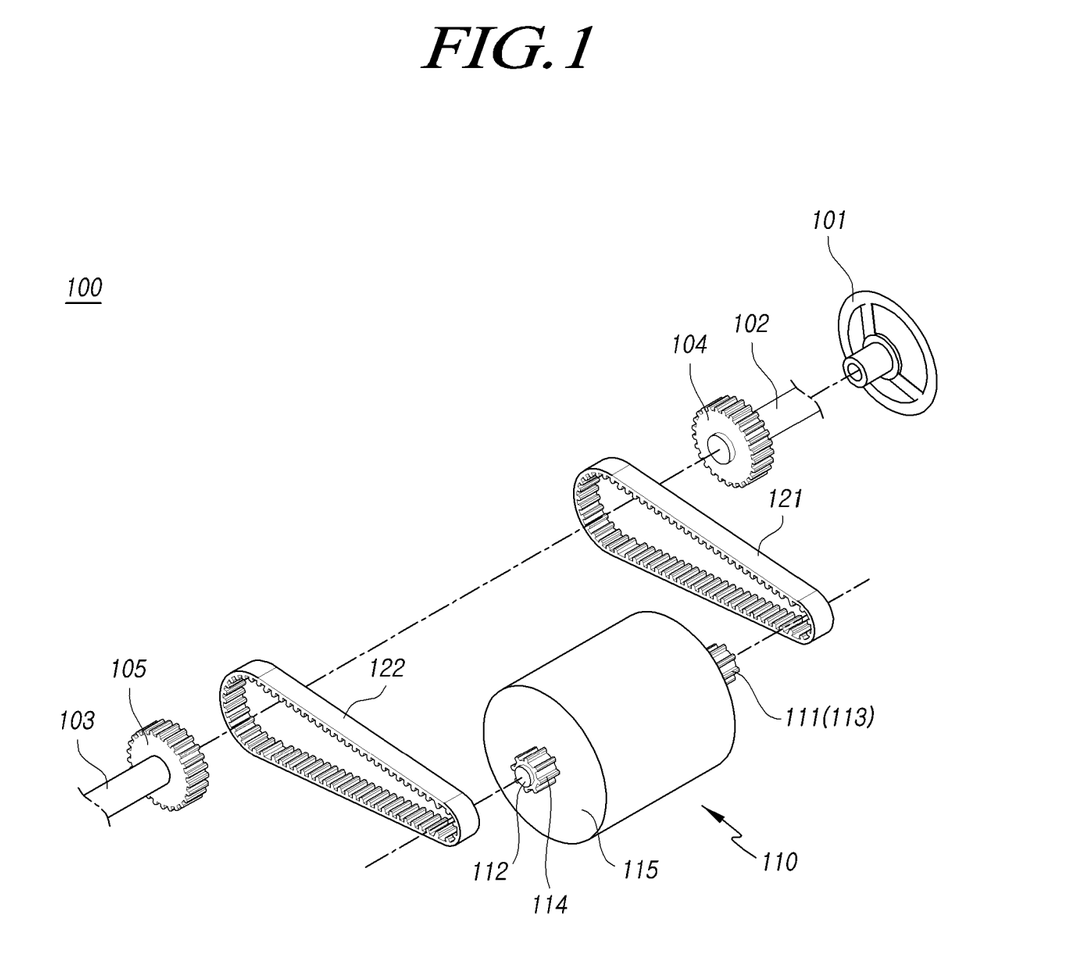
FIG. 1 is a perspective view illustrating a steering device of a vehicle according to the present embodiments.
Figure 2:
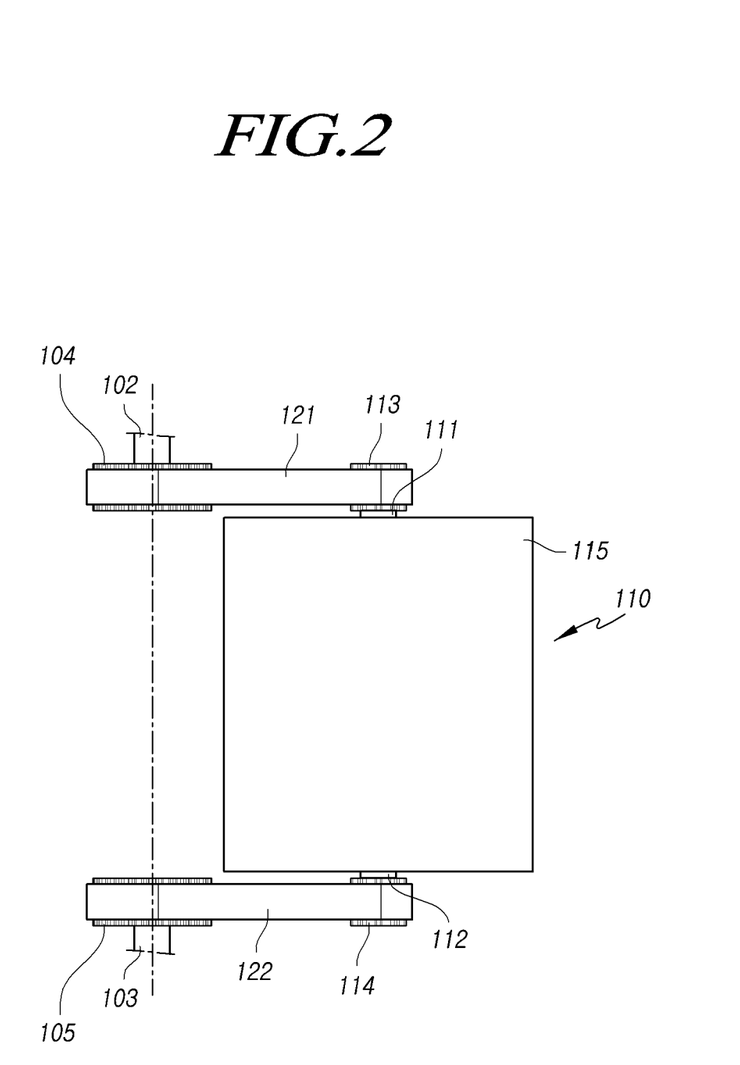
FIG. 2 is a plan view illustrating an assembled state of FIG. 1.
Figure 3:
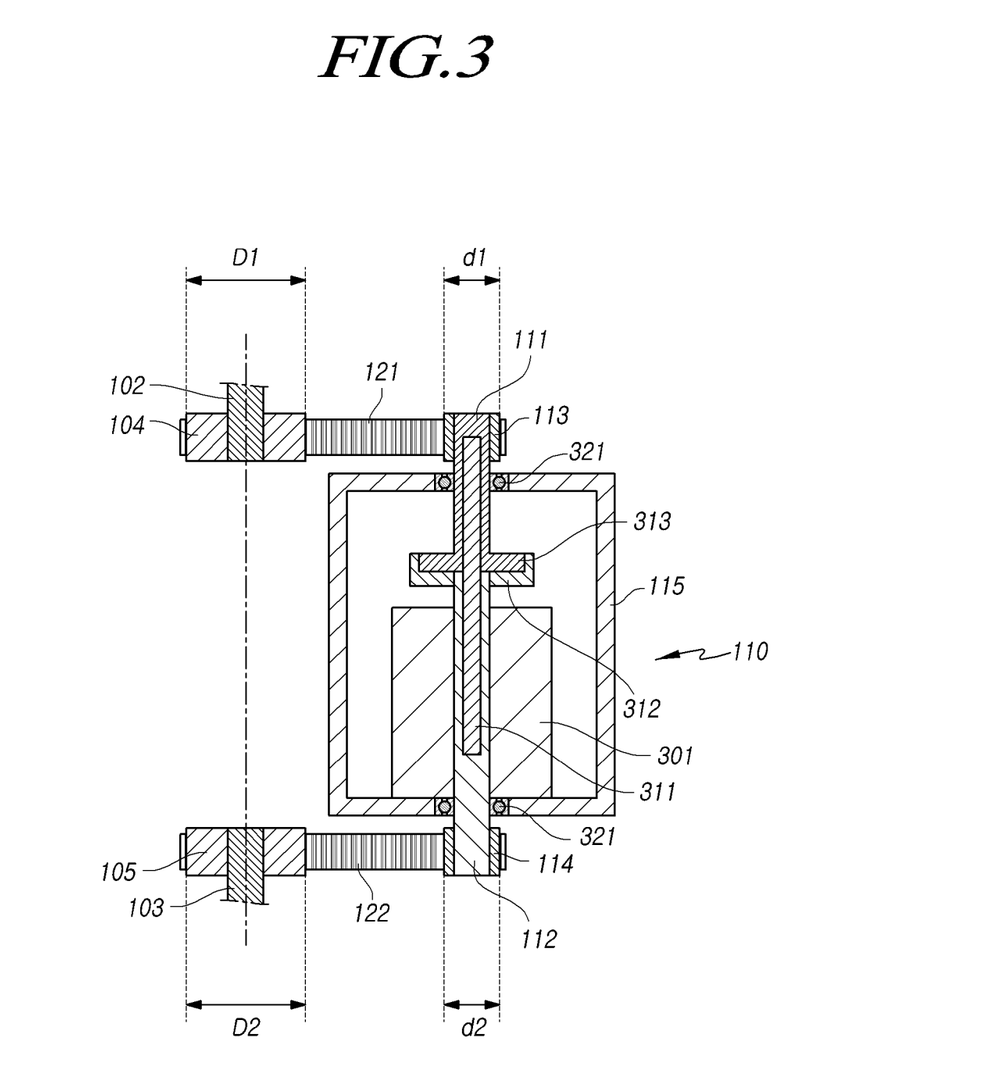
FIG. 3 is a cross-sectional view of FIG. 2.
Figure 4:
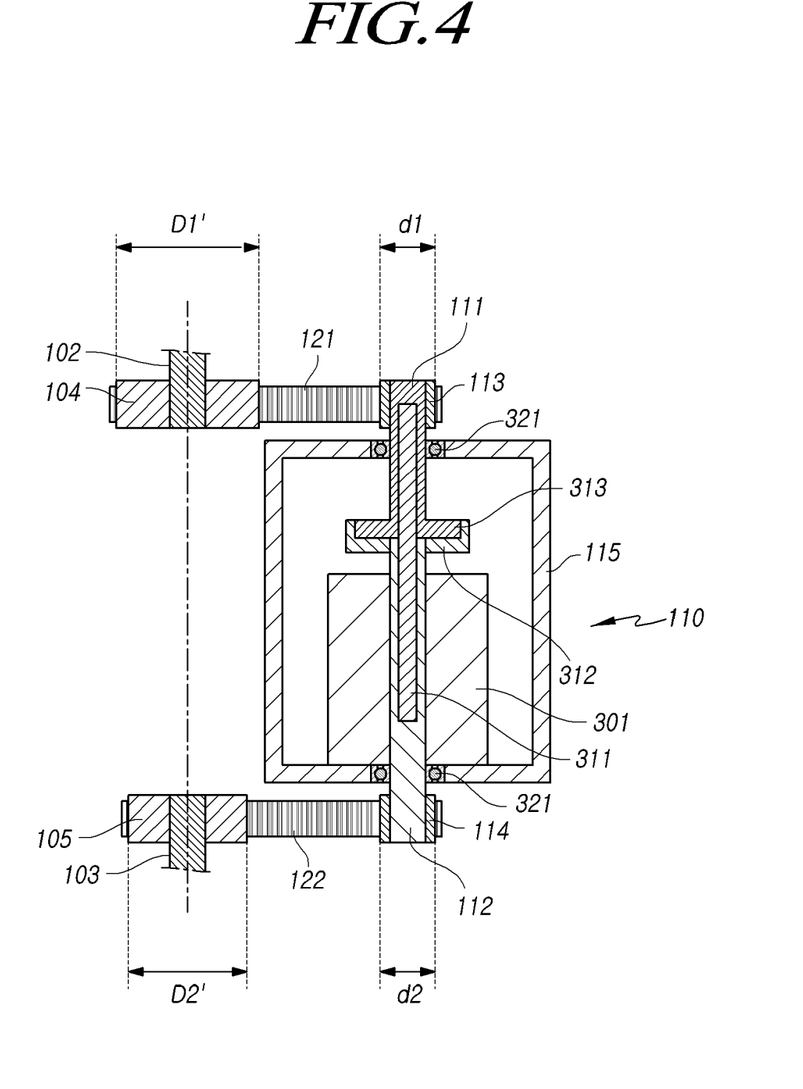
FIGS. 4 and 5 are cross-sectional views illustrating a steering device of a vehicle according to the present embodiments.
Figure 5:
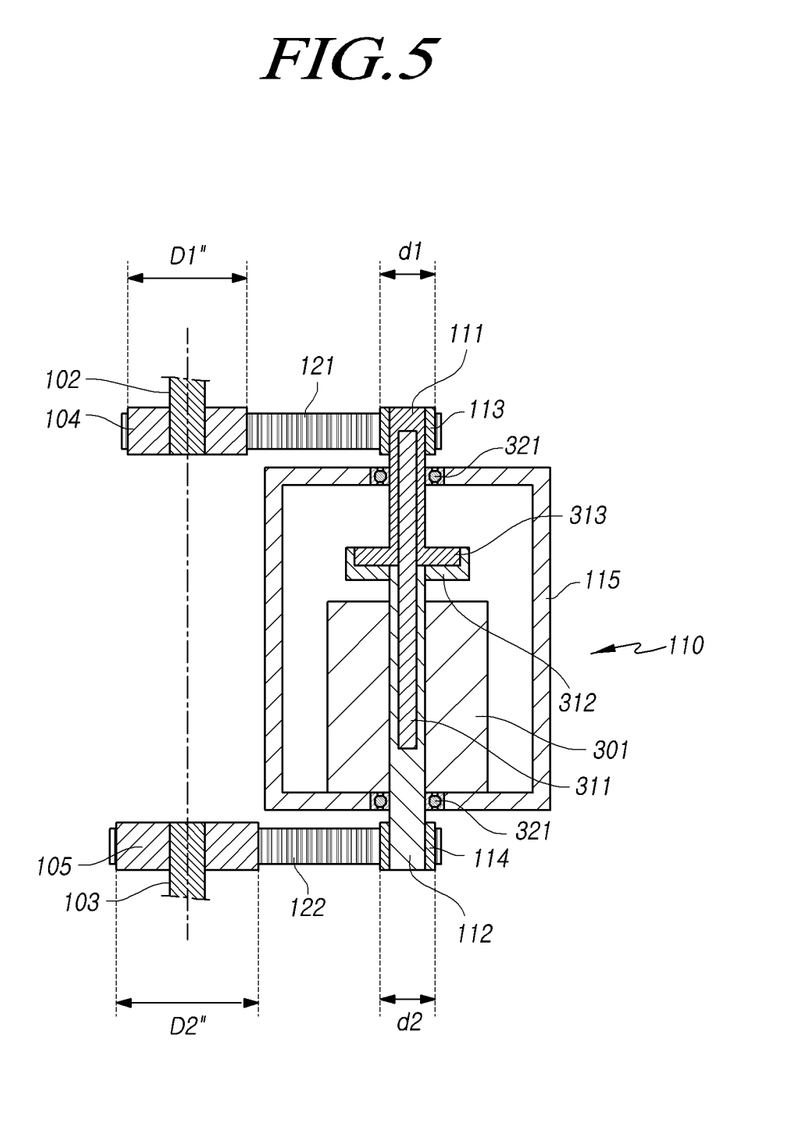
Figure 6:
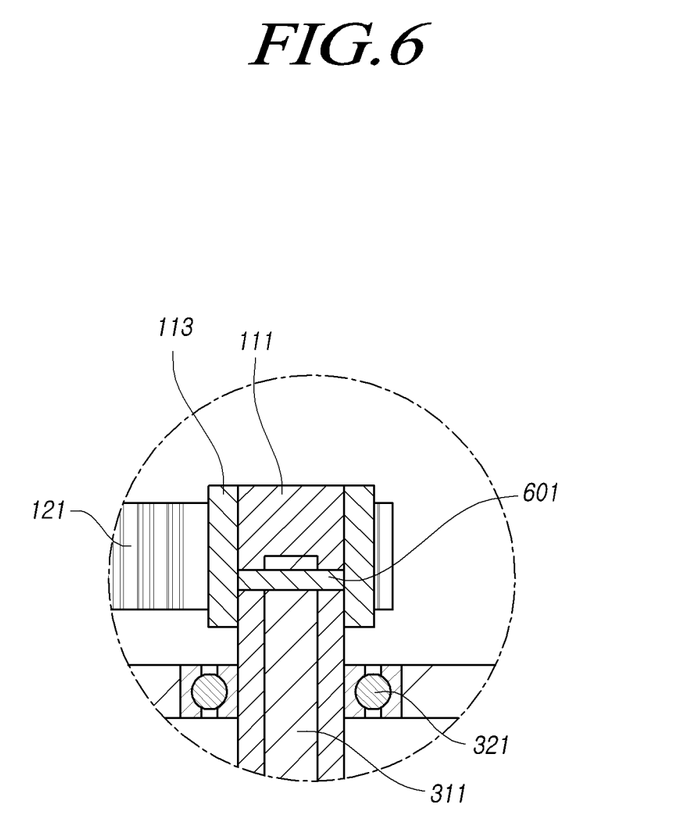
FIGS. 6 to 8 are cross-sectional views illustrating a steering device of a vehicle according to the present embodiments.
Figure 7:
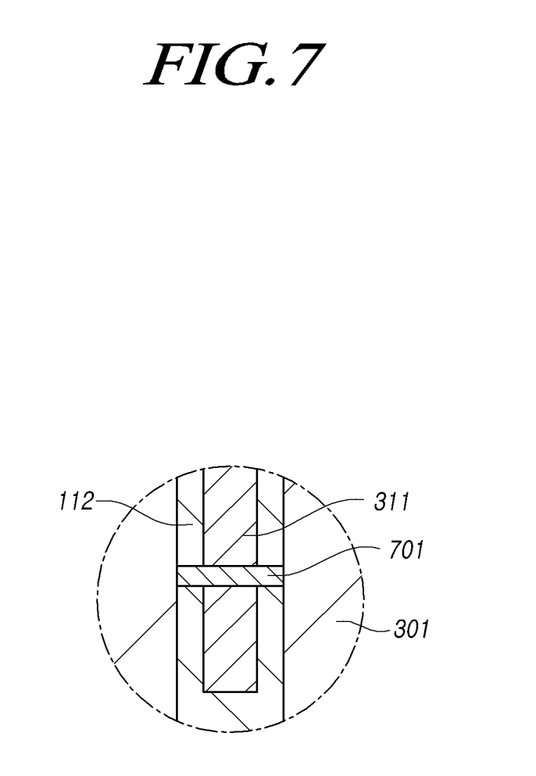
Figure 8:
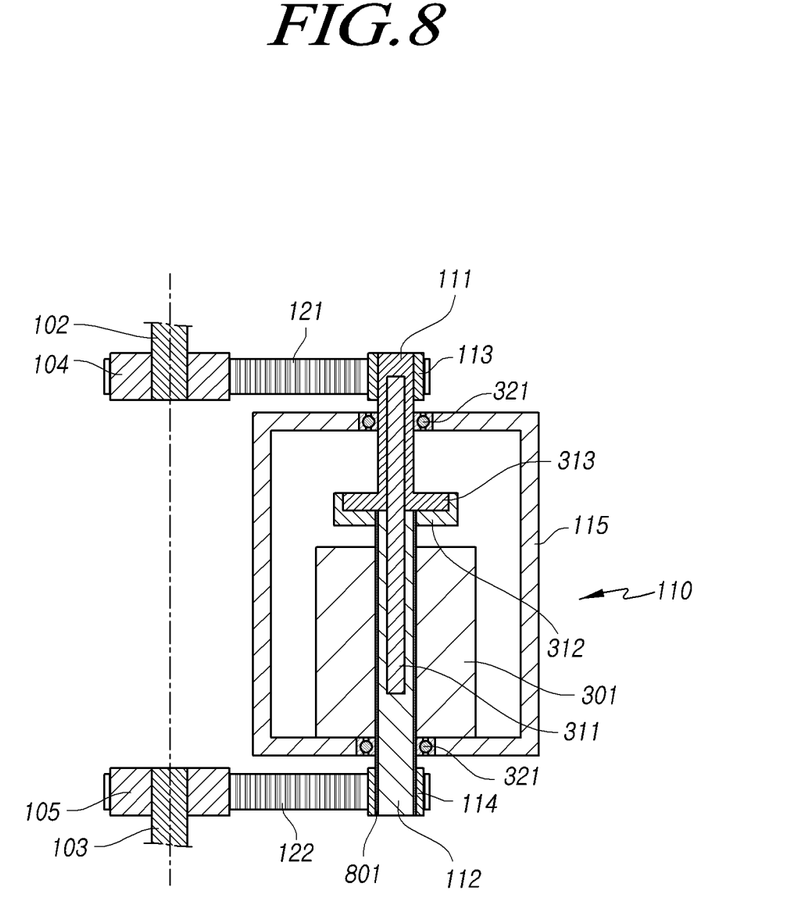

FIG. 1 is a perspective view illustrating a steering device of a vehicle according to the present embodiments. FIG. 2 is a plan view illustrating an assembled state of FIG. 1. FIG. 3 is a cross-sectional view of FIG. 2. FIGS. 4 and 5 are cross-sectional views illustrating a steering device of a vehicle according to the present embodiments. FIGS. 6 to 8 are cross-sectional views illustrating a steering device of a vehicle according to the present embodiments.

According to the present embodiments, a steering device 100 of a vehicle includes an input shaft 102 provided with an input shaft gear 104, a first shaft 111 provided with a first gear unit 113 and rotated by the input shaft 102, a second shaft 112 coupled with the first shaft 111 via a torsion bar 311 and provided with a second gear unit 114, a sensor 312 detecting a phase difference between the first shaft 111 and the second shaft 112, and an output shaft 103 provided with an output shaft gear 105 and rotated by the second shaft 112.

Referring to FIGS. 1 and 2, the input shaft 102 is connected with a steering wheel 101, and the driver's steering torque is applied thereto. The output shaft 103 is connected with a pinion shaft (not shown) engaged with a rack bar (not shown) to linearly move the rack bar by the driver's steering torque and the torque of a motor 301, which is described below, thereby steering the vehicle.

In this case, the input shaft 102 and the output shaft 103 are spaced apart from each other in the axial direction. There is provided a module 110 that is connected with the input shaft 102 and the output shaft 103 via a first belt 121 and a second belt 122 so as to transfer the power from the input shaft 102 to the output shaft 103.

In other words, the module 110 includes a housing 115 to receive, e.g., the first shaft 111, the second shaft 112, the torsion bar 311, the sensor 312, and the motor 301. The driver's steering torque applied to the input shaft 102 is attenuated by the gear ratio between the input shaft 102 and the first shaft 111 and is then applied to the torsion bar 311. The sensor 312 detects the driver's steering torque from the phase difference between the first shaft 111 and the second shaft 112, and the torque of the motor 301 is amplified by the gear ratio between the second shaft 112 and the output shaft 103 and is then applied to the output shaft 103.

Although not shown in the drawings, the housing 115 is coupled to the vehicle body, and the module 110 is fastened to the input shaft 102 and the output shaft 103, and the first belt 121 and the second belt 122 are mounted.

According to the present embodiments, in the steering device 100 of the vehicle, as the module 110 is connected to the input shaft 102 and the output shaft 103 by the first belt 121 and the second belt 122, the module 110 may be mounted or removed, and the gear ratio between the input shaft 102 and the first shaft 111 and the gear ratio between the output shaft 103 and the second shaft 112 may be simply changed, which is described below in detail.

A description is made below with reference to FIG. 3.

According to the present embodiments, in the steering device 100 of a vehicle, the input shaft 102 and the output shaft 103 are connected together via the first shaft 111 and the second shaft 112. Specifically, the input shaft 102 is provided with the input shaft gear 104, and the first shaft 111 is provided with the first gear unit 113, so that they are connected via the first belt 121. The output shaft 103 is provided with the output shaft gear 105, and the second shaft 112 is provided with the second gear unit 114, so that they are connected via the second belt 122.

The first shaft 111 and the second shaft 112 are coupled via the torsion bar 311, and the sensor 312 detects the phase difference between the first shaft 111 and the second shaft 112 to thereby detect the driver's steering torque through a relationship with the rigidity of the torsion bar 311.

In other words, the first shaft 111, the second shaft 112, and the torsion bar 311 have different axes from those of the input shaft 102 and the output shaft 103, so that the sensor 312 detects the driver's steering torque from the phase difference between the first shaft 111 and the second shaft 112, but not from the phase difference between the input shaft 102 and the output shaft 103.

The sensor 312 faces a protrusion 312 which is described below and transmits the driver's steering torque detected from the phase difference between the first shaft 111 and the second shaft 112 to an electronic control unit (not shown) of the vehicle, and the electronic control unit controls the motor 301, which is described below, to generate torque to the second shaft 112 to aid the driver in manipulating the steering wheel 101.

In this case, the first gear unit 113 may be formed with a diameter d1 smaller than the diameter D1 of the input shaft gear 104, and the second gear unit 114 may be formed with a diameter d2 smaller than the diameter D2 of the output shaft gear 105.

In other words, as the steering torque applied to the input shaft 102 is attenuated by the gear ratio between the first gear unit 113 and the input shaft gear 104 (hereinafter, referred to as a first gear ratio D1/d1), the torque applied to the torsion bar 311 is attenuated, and thus, the rigidity of the torsion bar 311 is relatively increased.

The torque applied to the torsion bar 311 is attenuated so that the rigidity is relatively increased. Thus, as compared with the conventional steering devices in which the torsion bar is provided coaxially with the input shaft and the output shaft, the angle at which the two opposite ends of the torsion bar 311 are twisted is reduced under the assumption of the same torsion bar rigidity and steering torque, so that the phase difference between the first shaft 111 and the second shaft 112 is reduced.

In other words, as the phase difference between the first shaft 111 and the second shaft 112 reduces, the phase difference between the input shaft 102 and the output shaft 103 is decreased as well, and thus, responsiveness to the driver's steering wheel manipulation is enhanced.

Further, since the phase difference between the input shaft 102 and the output shaft 103 decreases, the torque range measurable by the sensor 312 is expanded, thus increasing the torque range responsive to the driver's steering wheel manipulation.

Further, as the torque applied to the torsion bar 311 is attenuated, the torsion bar 311 and pins 601 and 701, which are described below, may secure durability.

Subsequently, the torque applied to the output shaft gear 105 and transferred to the pinion shaft is again amplified by the gear ratio between the second gear unit 114 and the output shaft gear 105 (hereinafter, referred to as a second gear ratio D2/d2).

Further, as the torque applied to the second shaft 112 by the motor 301 is also amplified by the second gear ratio, it is possible to easily aid the driver in manipulating the steering wheel even when a low-power motor is used.

In other words, the sum of the driver's steering torque and the torque of the motor 301 is amplified by the gear ratio between the second gear unit 114 and the output shaft gear 105 and is applied to the output shaft 103.

Meanwhile, although it is illustrated in the drawings that the input shaft gear 104 and the output shaft gear 105 and the first gear unit 113 and the second gear unit 114 are separately formed and coupled to the input shaft 102 and output shaft 103 and the first shaft 111 and second shaft 112, respectively, they may be integrally formed with the respective corresponding shafts, without limitations thereto. However, to change the gear ratio, it would be preferable that at least any one of the input shaft gear 104, output shaft gear 105, first gear unit 113, and second gear unit 114 is separately formed and coupled to the shaft.

Subsequently, the input shaft gear 104 and the first gear unit 113, and the output shaft gear 105 and the second gear unit 114, may be directly engaged with each other or may be connected via the first belt 121 and the second belt 122, respectively.

As described above, as the housing 115 receiving, e.g., the first shaft 111 and the second shaft 112, is provided to constitute the module 110, the steering device 100 of the vehicle according to the present embodiments may allow the module 110 to be simply mounted to or removed from the input shaft 102 and the output shaft 103 via the first belt 121 and the second belt 122.

Further, the first gear ratio and the second gear ratio may have different values. As the first gear ratio and the second gear ratio are set to different values, the rotation angles of the input shaft 102 and the output shaft 103 may be rendered to differ from each other.

In other words, if the first gear ratio is equal to the second gear ratio, the input shaft 102 and the output shaft 103 would rotate at the same angle. However, if the first gear ratio is larger than the second gear ratio, the output shaft 103 rotates more than the input shaft 102 while, if the first gear ratio is smaller than the second gear ratio, the output shaft 103 rotates less than the input shaft 102.

To change the moving distance of the rack bar relative to the number of rotations of the steering wheel in the conventional steering devices, the diameter of the pinion shaft and the number of gear teeth need to be changed, and this is significantly difficult. However, in the steering device 100 of the vehicle according to the present embodiments, it is possible to simply adjust the moving distance of the rack bar relative to the number of rotations of the steering wheel 101 by changing the first gear ratio and the second gear ratio.

However, if the input shaft gear 104 is directly engaged with the first gear unit 113, and the output shaft gear 105 is directly engaged with the second gear unit 114, increasing or decreasing the gear diameter may be limited given the internal space of the vehicle, or the input shaft 102 and the output shaft 103 may not be placed coaxially. The gear ratios may easily be changed without such issues by connecting the gears via the first belt 121 and the second belt 122.

Referring to FIG. 4, as compared with the embodiment of FIG. 3, the input shaft gear 104 is formed with a larger diameter (D1'>D1), or the output shaft gear 105 is formed with a smaller diameter (D2'<D2), so that the first gear ratio may be increased or the second gear ratio may be reduced, thereby increasing the moving distance of the rack bar relative to the number of rotations of the steering wheel 101. In this case, the length of the first belt 121 increases, and the length of the second belt 122 decreases.

Referring to FIG. 5, as compared with the embodiment of FIG. 3, it is possible to reduce the first gear ratio or increase the second gear ratio by forming the input shaft gear 104 with a smaller diameter (D1''''<D1) or forming the output shaft gear 105 with a larger diameter (D2''''>D2), thereby reducing the moving distance of the rack bar relative to the number of rotations of the steering wheel 101.

In this case, the length of the first belt 121 decreases, and the length of the second belt 122 increases.

Although the drawings illustrate an embodiment in which the diameters of the input shaft gear 104 and the output shaft gear 105 are changed, it is also possible to change the first gear ratio and the second gear ratio while the diameters of the first gear unit 113 and the second gear unit 114 are changed. Alternatively, it is possible to change only the diameter of one of the input shaft gear 104 and the output shaft gear 105 or only the diameter of one of the first gear unit 113 and the second gear unit 114.

In other words, although the gears are replaced with other gears with larger or smaller diameters to change the first gear ratio and the second gear ratio, it is possible to simply connect the input shaft gear 104 and the guide unit and connect the output shaft gear 105 and the second gear unit 114 by adjusting the length of the belts. Thus, the gear ratios may easily be changed, and the input shaft 102 and the output shaft 103 may be provided coaxially, thus minimizing the space occupied by the steering device 100 in the vehicle body.

Meanwhile, the first shaft 111 and the second shaft 112 may be hollow, and a first end of the torsion bar 311 is inserted into the first shaft 111, and a second end (opposite to the first end) of the torsion bar 311 may be inserted into the second shaft 112.

In other words, the first end of the torsion bar 311 is fixed to the first shaft 111, and the second end is fixed to the second shaft 112, so that the two opposite ends of the torsion bar 311 are twisted when the steering torque is applied, causing a phase difference between the first shaft 111 and the second shaft 112, which is detected by the sensor 312.

Referring to FIGS. 6 and 7, the first end of the torsion bar 311 may be press-fitted into the first shaft 111 or coupled to the first shaft 111 by the pin 601, or the second end may also be press-fitted into the second shaft 112 or coupled to the second shaft 112 by the pin 701.

In the case of coupling via the pins 601 and 701, holes are formed through the inner circumferential surface and outer circumferential surface of the first shaft 111 and the second shaft 112, and holes corresponding thereto are formed in the torsion bar 311, so that the pins 601 and 701 are press-fitted into the holes to fix the two opposite ends of the torsion bar 311 to the first shaft 111 and the second shaft 112.

When the torsion bar 311 is coupled by the pins 601 and 701, the torque applied to the torsion bar 311 is attenuated by the first gear ratio as described above, so that the torque applied to the pins 601 and 701 may also be attenuated, thus increasing the durability of the pins 601 and 701.

Meanwhile, there may be provided the housing 115 to receive the first shaft 111 and the second shaft 112. Since the torsion bar 311 is inserted in the first shaft 111 and the second shaft 112, the torsion bar 311 is also provided inside the housing 115.

As the housing 115 is provided as described above, the first shaft 111, second shaft 112, torsion bar 311, and the sensor 312 and motor 301, described below, are provided in the housing 115 to constitute the module 110 in the steering device 100 of the vehicle according to the present embodiments.

As such a module 110 is configured, it is possible to simply mount or remove the module 110 to/from the input shaft 102 and the output shaft 103 by the first belt 121 and the second belt 122 as described above.

For the module 110 to be mounted on the input shaft 102 and output shaft 103, a first end of the first shaft 111 protrudes from the housing 115, and the first gear unit 113 is provided on the first end of the first shaft 111 which protrudes from the housing 115, and a second end of the second shaft 112 protrudes from the housing 115, and the second gear unit 114 may be provided on the second end of the second shaft 112, which protrudes from the housing 115.

In other words, the first gear unit 113 and the second gear unit 114 are positioned on outer sides of the housing 115. Thus, upon changing the first gear ratio and the second gear ratio, it is possible to simply change the first gear unit 113 and the second gear unit 114 from outside of the housing 115 without the need for disassembling the module 110 as described above.

The first shaft 111 and the second shaft 112 may be coupled to the housing 115 via bearings 321.

Further, as described above, the phase difference between the first shaft 111 and the second shaft 112 is detected so that driver's steering torque is detected based on the rigidity of the torsion bar 311. Such a sensor 312 is coupled to one of the first shaft 111 and the second shaft 112, and the protrusion 313 projecting in the diameter direction to face the sensor 312 may be provided on the other.

In other words, the sensor 312 may be provided in a position where the first shaft 111 and the second shaft 112 are adjacent to each other. As an example, as shown in the drawings, the sensor 312 may be coupled to the first end of the second shaft 112, and the protrusion 313 may be provided on the second end of the first shaft 111.

The protrusion 313 is rotated along with the first shaft 111, and the sensor 312 is rotated along with the second shaft 112, so that the sensor 312 may detect the rotation angle of the protrusion 313 to thereby obtain the phase difference between the first shaft 111 and the second shaft 112.

Although not shown in the drawings, there may be provided two or more protrusions 313 spaced apart from each other along the circumferential direction.

Further, as described above, the motor 301 may be provided to generate torque to the second shaft 112. The motor 301 may be provided inside the housing 115 to constitute a part of the module 110.

The motor 301 may be provided to generate torque to the output shaft 103. However, it is preferable that the motor 301 generates torque to the second shaft 112 to provide torque amplified by the second gear ratio to the output shaft 103 as described above.

The motor shaft of the motor 301 may be integrally formed with the second shaft 112. In other words, the second end of the torsion bar 311 may be inserted into the motor shaft.

In this case, the torsion bar 311 is inserted into the first end of the motor shaft, and the second end of the motor shaft protrudes from the motor 301 to provide the second gear unit 114.

Alternatively, referring to FIG. 8, the motor 301 may have a hollow motor shaft 801, so that the second shaft 112 may be inserted and coupled into the motor shaft 801. In other words, the second shaft 112 into which the torsion bar 311 is inserted may be inserted into the hollow motor shaft 801.

In this case, the sensor 312 and the second gear unit 114 may be provided at ends of the motor shaft 801 as shown in the drawings or, although not shown in the drawings, the second shaft 112 may protrude from the motor shaft 801 so that the sensor 312 and the second gear unit 114 may be provided at ends of the second shaft 112.

By the so-shaped steering device of the vehicle, it is possible to attenuate the torque applied to the torsion bar and hence relatively increase the rigidity of the torsion bar and reduce the phase difference between the input shaft and the output shaft, thereby enhancing the responsiveness to the driver's steering wheel manipulation, increasing the responsive torque range, securing the durability of parts, e.g., the torsion bar, and enabling simplified adjustment for the moving distance of the rack bar relative to the number of rotations of the steering wheel 101.

By the so-shaped steering device of the vehicle, the torque applied to the torsion bar may be attenuated, thereby relatively increasing the rigidity of the torsion bar. Thus, the phase difference between the first shaft and the second shaft may reduce, and so does the phase difference between the input shaft and the output shaft. Thus, it is possible to enhance responsiveness to the driver's steering wheel manipulation.

Further, since the phase difference between the input shaft and the output shaft decreases, the torque range measurable by the sensor may expand, so that the torque range responsive to the driver's steering wheel manipulation may increase.

Further, as the torque applied to the torsion bar is attenuated, the torsion bar and the pins may secure durability.

It is also possible to simply adjust the moving distance of the rack bar relative to the number of rotations of the steering wheel while changing the first gear ratio and the second gear ratio without the need for changing, e.g., the diameter of the pinion shaft or gear dimensions.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steering device of a vehicle, the steering device comprising:
   an input shaft provided with an input shaft gear;
   a first shaft provided with a first gear unit and configured to be rotated by the input shaft;
   a second shaft coupled with the first shaft via a torsion bar and provided with a second gear unit;
   a sensor configured for detecting a phase difference between the first shaft and the second shaft;
   an output shaft provided with an output shaft gear and configured to be rotated by the second shaft; and
   a housing receiving the first shaft and the second shaft,
   wherein
   the first shaft includes a first end protruding from the housing and provided with the first gear unit, and
   the first gear unit at the first end of the first shaft is provided outside of the housing.

2. The steering device of claim 1, wherein the first gear unit is smaller in diameter than the input shaft gear, and the second gear unit is smaller in diameter than the output shaft gear.

3. The steering device of claim 2, wherein the input shaft gear and the first gear unit are connected to each other via a first belt, and the output shaft gear and the second gear unit are connected to each other via a second belt.

4. The steering device of claim 3, wherein a gear ratio between the first gear unit and the input shaft gear differs from a gear ratio between the second gear unit and the output shaft gear.

5. The steering device of claim 1, wherein the first shaft and the second shaft are hollow, and wherein a first end of the torsion bar is inserted into the first shaft, and a second end of the torsion bar is inserted into the second shaft.

6. The steering device of claim 5, wherein the first end of the torsion bar is press-fitted into the first shaft or coupled to the first shaft by a pin.

7. The steering device of claim 5, wherein the second end of the torsion bar is press-fitted into the second shaft or coupled to the second shaft by a pin.

8. The steering device of claim 1, wherein the first shaft is coupled to the housing via a bearing.

9. The steering device of claim 1, wherein a second end of the second shaft protrudes from the housing, and wherein the second gear unit is provided at the second end of the second shaft.

10. The steering device of claim 9, wherein the second shaft is coupled to the housing via a bearing.

11. The steering device of claim 9, wherein the sensor is coupled to any one of the first shaft or the second shaft.

12. The steering device of claim 11, wherein a protrusion is provided at the other of the first shaft or the second shaft, the protrusion projecting in a diameter direction and facing the sensor.

13. The steering device of claim 9, wherein a motor is provided inside the housing to generate torque to the second shaft.

14. The steering device of claim 13, wherein a motor shaft of the motor is integrally formed with the second shaft.

15. The steering device of claim 13, wherein the motor shaft of the motor is hollow to allow the second shaft to be inserted and coupled to the motor shaft.

16. A steering device of a vehicle, comprising:
   an input shaft provided with an input shaft gear;
   a first shaft provided with a first gear unit and rotated by the input shaft;
   a second shaft coupled with the first shaft via a torsion bar and provided with a second gear unit;
   a sensor detecting a phase difference between the first shaft and the second shaft; and
   an output shaft provided with an output shaft gear and rotated by the second shaft,
   wherein
   the first shaft and the second shaft are hollow, and wherein a first end of the torsion bar is inserted into the first shaft, and a second end of the torsion bar is inserted into the second shaft,
   the steering device further comprises a housing receiving the first shaft and the second shaft,
   a first end of the first shaft protrudes from the housing, and the first gear unit is provided at the first end of the first shaft,
   a second end of the second shaft protrudes from the housing, and the second gear unit is provided at the second end of the second shaft,
   the sensor is coupled to any one of the first shaft or the second shaft, and
   a protrusion is provided at the other of the first shaft or the second shaft, the protrusion projecting in a diameter direction and facing the sensor.

17. A steering device of a vehicle, comprising:
   an input shaft provided with an input shaft gear;
   a first shaft provided with a first gear unit and rotated by the input shaft;
   a second shaft coupled with the first shaft via a torsion bar and provided with a second gear unit;
   a sensor detecting a phase difference between the first shaft and the second shaft; and
   an output shaft provided with an output shaft gear and rotated by the second shaft,
   wherein
   the first shaft and the second shaft are hollow, and wherein a first end of the torsion bar is inserted into the first shaft, and a second end of the torsion bar is inserted into the second shaft,
   the steering device further comprises a housing receiving the first shaft and the second shaft,
   a first end of the first shaft protrudes from the housing, and the first gear unit is provided at the first end of the first shaft,
   a second end of the second shaft protrudes from the housing, and the second gear unit is provided at the second end of the second shaft, and
   a motor is provided inside the housing to generate torque to the second shaft.

* * * * *